US006487483B1

(12) United States Patent
Gillis

(10) Patent No.: US 6,487,483 B1
(45) Date of Patent: Nov. 26, 2002

(54) SYSTEM AND METHOD OF OCCUPANT SENSING

(75) Inventor: Edward J. Gillis, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/871,827

(22) Filed: Jun. 1, 2001

(51) Int. Cl.$^7$ ............................................. B60R 21/32
(52) U.S. Cl. ........................................ 701/45; 280/735
(58) Field of Search ......................... 701/45; 280/735; 180/271, 273

(56) References Cited

U.S. PATENT DOCUMENTS

| | | |
|---|---|---|
| 5,074,583 A | 12/1991 | Fujita et al. |
| 5,172,790 A | 12/1992 | Ishikawa et al. |
| 5,232,243 A | 8/1993 | Blackburn et al. |
| 5,474,327 A | 12/1995 | Schousek |
| 5,570,903 A | 11/1996 | Meister et al. |
| 5,612,876 A | 3/1997 | Zeidler et al. |
| 5,626,359 A | 5/1997 | Steffens, Jr. et al. |
| 5,732,375 A | 3/1998 | Cashler |
| 5,739,757 A | 4/1998 | Gioutsos |
| 5,821,633 A | 10/1998 | Burke et al. |
| 5,848,661 A | 12/1998 | Fu |
| 5,851,026 A | 12/1998 | Schoos et al. |
| 5,868,423 A | 2/1999 | Takimoto et al. |
| 5,878,620 A | 3/1999 | Gilbert et al. |
| 5,900,677 A | 5/1999 | Musiol et al. |
| 5,904,219 A | 5/1999 | Anahid et al. |
| 5,939,795 A | 8/1999 | Yu |
| 5,948,031 A | 9/1999 | Jinno et al. |

*Primary Examiner*—Richard M. Camby
(74) *Attorney, Agent, or Firm*—Tarolli, Sundheim, Covell, Tummino & Szabo L.L.P.

(57) ABSTRACT

A system (11) and method determine a vehicle occupant characteristic. A plurality of sensors (50) sense a parameter and output a parameter indicative signal. The sensors (50) are arranged in a plurality of groups (e.g., A–F), with each sensor of a group sensing a similar parameter value. A controller (16) utilizing only a portion of the sensors within each group to make a determination regarding the occupant characteristic.

30 Claims, 3 Drawing Sheets

SYSTEM AND METHOD OF OCCUPANT SENSING

TECHNICAL FIELD

The present invention is directed to a system and method for sensing an occupant characteristic, and particularly for sensing occupant position for use in an occupant protection system.

BACKGROUND OF THE INVENTION

Vehicle occupant protection systems are generally well known in the art. Occupant protection systems help protect vehicle occupants during vehicle crash events. An occupant protection system typically includes one or more actuatable components, such as an air bag, a seat belt pretensioner, a side curtain, etc. During a crash event, these components are actuatable to provide a cushioning/restraining force to the occupant.

Often these protection system components are selectively actuatable based upon a number of factors that may include, among other things, sensed occupant characteristics and/or crash conditions. An air bag, for instance, may be controlled to be actuated or deployed based upon a determination of whether a crash metric, such as crash acceleration, exceeds a threshold value. Likewise, the air bag may also be controlled depending upon a value of a sensed weight of the occupant and/or a sensed position of the occupant.

An air bag is typically inflated by a source of inflation fluid. The source of inflation fluid is operatively connected to the air bag so that it can fill and thereby deploy the air bag. The inflation fluid often includes a gas that is generated from the combustion of a pyrotechnic material. The pyrotechnic material is typically ignited by an electric squib, which receives an ignition signal from a controller. The controller is often a microprocessor or microcomputer, which is programmed to generate the ignition signal based upon input signals it receives from external sensors. The external sensors sense one or more of the above-mentioned factors. The input signals are therefore representative of one or more of the above-mentioned factors. As such, actuation or deployment of the air bag is based upon one or more of the above-mentioned factors.

In addition to using the above-mentioned factors to control the actuation of the air bag, the controller of an occupant protection system may use one or more of the foregoing factors to control the rate at which the air bag is deployed as well as the degree to which the air bag is inflated. For instance, if more than one inflation fluid source is simultaneously connected to the air bag, the rate at which the air bag is deployed and the degree to which the air bag is inflated are controlled by controlling how and when these multiple Inflation fluid sources are ignited. Partial deployment of the air bag is effected, for instance, where the controller sends an affirmative ignition signal to only one of the squibs, thereby igniting only one of the inflation fluid sources. Alternatively, full and rapid deployment of the air bag is effected when the controller simultaneously sends an affirmative ignition signal to all of the squibs, thereby igniting all of the inflation fluid sources simultaneously.

The rate and degree of air bag inflation is also controlled in many ways other than utilizing multiple inflation fluid sources. For instance, vent valves are also used to control the rate and degree of air bag inflation. Vent valves are operatively connected to one or more inflation fluid sources. When fully opened, a vent valve vents a portion of the inflation gas away from the air bag. Accordingly, when a vent valve is fully opened a fair amount of inflation gas is vented away from the air bag and inflation pressure within the air bag is lessened. Conversely, when the vent valve is not opened or is only opened slightly, very little of the inflation gas is vented away from the air bag and the air bag is deployed at a relatively rapid rate. As with the multiple inflation fluid sources, the operation of vent valves is typically controlled by a controller.

The occupant's position and weight are used to control the manner in which the air bag is deployed. The occupant's position affects how and to what extend an air bag should be deployed. For instance, if the occupant is displaced in a direction toward the air bag during a crash event, it may be desirable to only partially inflate the air bag as the occupant's motion expedites the engagement of the air bag and the occupant. Alternatively, if the occupant is moved completely out of position during a crash event, such that deployment of the air bag would offer little or no protection to the occupant, it may be desirable to not deploy the air bag at all. In such a case, the controller simply does not send an affirmative ignition signal to any of the squibs.

Also, an occupant's weight may be a factor that affects how and to what extent an air bag should be deployed. For example, a larger occupant may require full deployment to afford the desired protection to the occupant, whereas a smaller occupant may only require partial deployment to restrain the occupant in a desired fashion.

For purposes of designing and evaluating occupant protection systems, industrial standards have been established to model, on a theoretical basis, the population as a whole. These standards define theoretical individuals in terms of overall weight, height, torso length, and various other anatomical characteristics. Based on actual measurements of one of these characteristics, such as weight, other characteristics of a vehicle occupant can be assumed, with a predetermined statistical probability of correctness, from the industrial standards.

In accordance with these standards, deployment commands are often programmed into the controller and/or stored within the memory of an occupant protection system. Therefore, if the occupant's weight falls within an upper weight range, the occupant may be profiled as an adult passenger. The controller then uses the associated deployment command to fully deploy the air bag. As such, the controller sends command signals to the inflation fluid sources and/or vent valves to effect full deployment of the air bag so that the adult passenger is restrained by the air bag in a desired fashion.

Moreover, depending upon the weight of the occupant and his or her related theoretical anatomical dimensions, the air bag is deployed in a crash condition at a time after the onset of a crash which is derived from, typically, a look-up table. Data stored in the look-up table is derived from historical data and/or empirical testing.

Several arrangements exist to deploy an air bag based upon an occupant's weight and/or position. For instance, U.S. Pat. No. 5,232,243 discloses an occupant sensing apparatus. The apparatus includes an array of sensors located in the seat that is used to determine the occupant's position and weight and to control deployment of the occupant protection system via determined position and weight.

Similarly, U.S. Pat. No. 5,732,375 discloses a method of inhibitIng or allowing air bag deployment. The patent discloses an array of pressure sensors on a vehicle seat and a microprocessor that is programmed to sample each sensor. The microprocessor also determines the pattern of pressure distribution by evaluating local groups of sensors.

U.S. Pat. No. 5,821,633 discloses a sensor system for use in a vehicle air bag deployment sensor. The sensor system is embedded in a vehicle seat and comprises six sensors. Once the location of the center of force is known from the sensors, appropriate controls are implemented to determine whether and how an air bag is to be deployed.

U.S. Pat. No. 5,474,327 discloses a vehicle occupant protection system. The protection system includes eight pressure sensors located within a seat cushion. The response of each sensor to occupant pressure is monitored by a microprocessor. The microprocessor calculates total weight and weight distribution.

U.S. Pat. No. 5,739,757 discloses a vehicle passenger weight sensor. A vehicle safety system includes crash detection circuitry and a system for determining the weight of a passenger on the vehicle seat. The air bag may be disabled depending upon the detected weight of the passenger. The weight system includes a forward sensor that measures weight on a forward portion of the seat and a rearward sensor that measures weight on a rearward portion of the seat.

U.S. Pat. No. 5,612,876 discloses a device for detecting seat occupancy in a motor vehicle. The device is especially for inhibiting air bag release when a seat is unoccupied. A seat occupancy sensor includes a front sensing region and a rear sensing region to determine whether the front seat passenger is in a sitting position close to the front seat edge of the seat cushion.

It is desirable to track and update the position of the occupant because the position of the occupant may change during a crash event and/or pre-crash braking situation. Also, the position of the occupant may change rather rapidly because crash events and/or pre-crash braking situations often occur in a relatively short period of time.

SUMMARY OF THE INVENTION

In accordance with one aspect, the present invention provides a system for determining a vehicle occupant characteristic. The system includes a plurality of sensors for sensing a parameter and outputting a parameter indicative signal. The sensors are arranged in a plurality of groups, with each sensor of a group sensing a similar parameter value. The system includes determination means for utilizing only a portion of the sensors within each group to make a determination regarding the occupant characteristic.

In accordance with another aspect, the present invention provides a system for determining a vehicle occupant weight-related characteristic. The system includes a plurality of weight sensors. Each weight sensor senses an applied force and outputting a signal indicative of the sensed force. The plurality of sensors are located to sense applied force at a plurality of areas of a vehicle seat. The system includes means for utilizing the force indicative signals from only a portion of the sensors to derive an indication of the occupant weight-related characteristic.

In accordance with another aspect, the present invention provides a system for determining an occupant weight-related characteristic. The system includes a plurality of weight sensors located within a vehicle seat. Each of the sensors senses an applied force and outputs a signal indicative of the sensed force. A controller of the system groups the plurality of sensors into a plurality of sensor sets.

In accordance with yet another aspect, the present invention provides a method for determining a vehicle occupant characteristic. A plurality of sensors that sense a parameter are arranged into a plurality of groups. Each sensor of a group senses a similar parameter value and outputs a parameter indicative signal. Only a portion of the sensors within each group is utilizing to make a determination regarding the occupant characteristic.

In accordance with still another aspect, the present invention provides a method for determining an occupant weight-related characteristic. A plurality of sensors located within a vehicle seat is grouped into a plurality of sensor sets. Each of the sensors senses an occupant characteristic and outputs a signal indicative of the sensed occupant characteristic. The output of an $N^{th}$ sensor in each set is sampled prior to sampling the output of an $N^{th+1}$ sensor in another set.

BRIEF DESCRIPTION OF THE DRAWINGS

The foregoing and other features and advantages of the present invention will become more apparent to one skilled in the art upon consideration of the following description of the invention and the accompanying drawings, wherein.

DESCRIPTION OF AN EXEMPLARY EMBODIMENT

Figure 1:
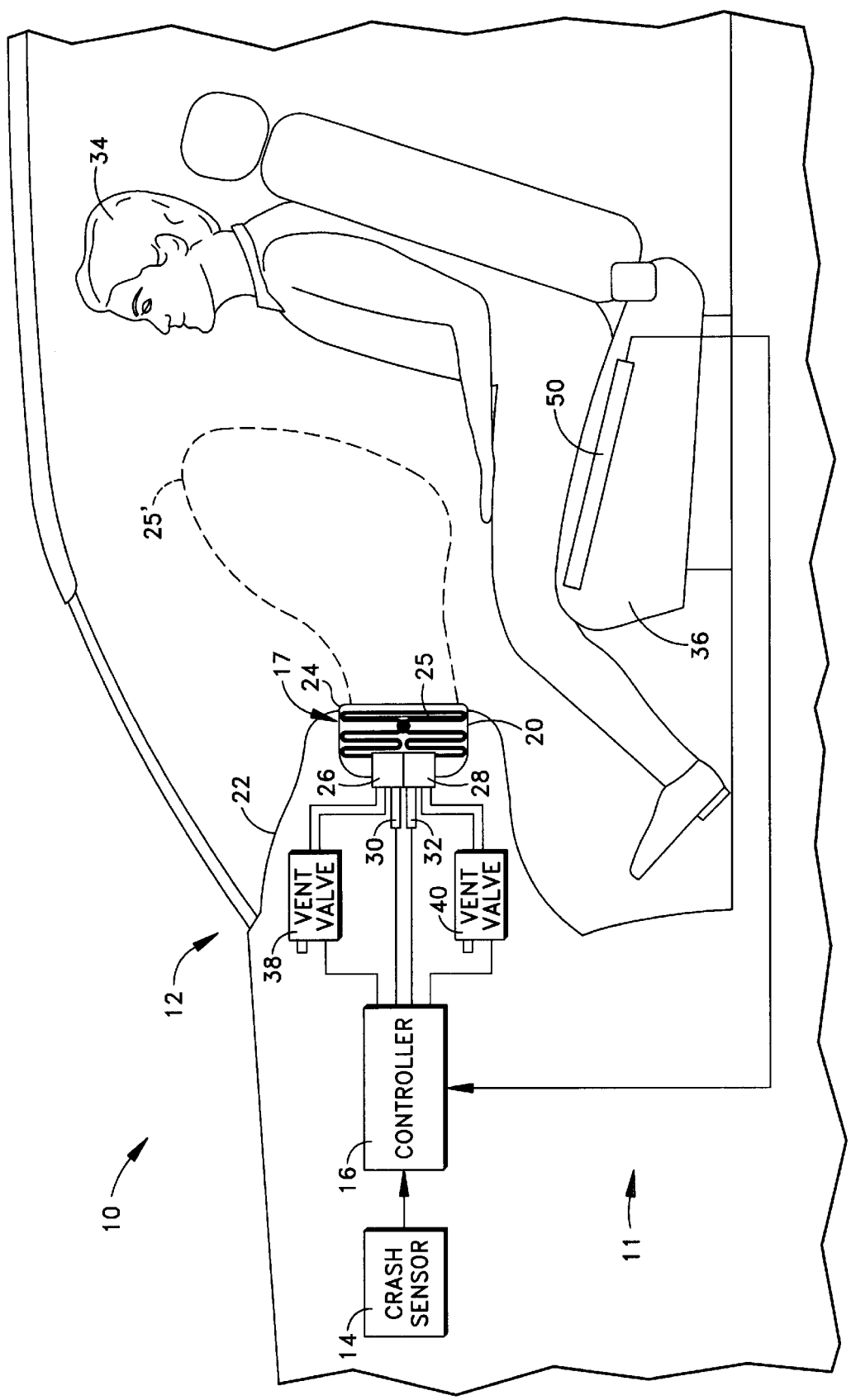
FIG. 1 is a schematic diagram of a portion of a vehicle that includes an example occupant protection system wherein the present invention is incorporated.

With reference to FIG. 1, a side view of a portion of a vehicle 10 is illustrated. The vehicle 10 includes an occupant protection system 12 wherein an occupant characteristic sensing system 11 of the present invention is incorporated. The protection system 12 includes a vehicle crash sensor 14 that is mounted to the vehicle and is operatively connected to a controller 16. Many different types of crash sensors are known in the art. The crash sensor 14 illustrated in FIG. 1 may be any type of crash sensor known in the art. For example, the crash sensor 14 may be an accelerometer that outputs an electrical signal having a characteristic indicative of a vehicle crash condition.

The controller 16 analyzes the output signal from the crash sensor 14 and determines if a deployment crash event is occurring. For instance, the controller 16 may determine whether the signal from the crash sensor 14 reaches a predetermined level or remains at a predetermined level for a predetermined period of time. If so, this is may be regarded as an indication that a deployment crash event is occurring. A deployment crash event is a crash event wherein it may be desirable to deploy an occupant protection component.

In the example shown, the protection system 12 includes an air bag module 17 as the protection component. The air bag module 17 includes a reaction can or housing 20 that is mounted in a dashboard or instrument panel 22 of the vehicle 10. A cover 24 covers an inflatable air bag 25 and is adapted to open easily upon inflation of the air bag 18 into its deployed state (shown in phantom 25').

In the example illustrated, two sources of inflation fluid 26, 28 are mounted at the back of the housing 20 and are operatively connected to the air bag 25. The inflation fluid sources include combustible pyrotechnic materials. However, it should be appreciated that the inflation fluid sources may contain pressurized gas in addition to or as an alternative to the pyrotechnic material.

The pyrotechnic materials are actuated by the ignition of one or more electrical squibs 30, 32. In the example illustrated, two squibs 30, 32 are shown. The controller 16 is connected to each of the squibs 30, 32. The controller 16 ignites the squibs 30, 32 by sending an affirmative ignition signal to each squib. The ignition signal is typically an electrical signal of a particular magnitude and/or duration. When the controller 16 ignites one or both of the squibs 30, 32, inflation fluid is provided into the air bag 18. Once inflated, the air bag 18 is operative to help protect the occupant 34 located on the vehicle seat 36. By controlling whether one or both of the inflation fluid sources 26, 28 are actuated, the controller 16 can control the inflation rate and pressure of the air bag 18.

In the illustrated example of FIG. 1, vent valves 38, 40 are also provided to control the inflation rate and pressure of the air bag 18. However, it is to be understood that vent valves may not be necessary. In the shown example, one vent valve (e.g., 38) is operatively connected to each of the inflation fluid sources (e.g., 26). The vent valves 38, 40 are operatively connected to the controller 16 and are used to control the inflation of the air bag 18 by regulating the amount of inflation fluid that flows into the air bag 18. If the vent valves 38, 40 are fully closed, the air bag 18 inflates to its maximum volume at a maximum inflation rate. By controlling the degree to which the vent valves 38, 40 are opened, the inflation rate and pressure of the air bag 18 are controlled.

In accordance with the present invention, a plurality of sensors 50 are provided for sensing a vehicle occupant characteristic. In the illustrated example, the sensors 50 are located within the vehicle seat 36 and sense applied weight force. The sensors 50 may be any type of weight sensor commonly known in the art. For example, the sensors 50 may have a multi-layer piezoelectric film construction.

By illustrating the sensors 50 as weight sensors, it is merely meant that each sensor senses the downward force applied to it. It is to be appreciated that the present invention is applicable to other sensor types for sensing other occupant characteristic types. Thus, it is to be appreciated that the invention is not limited to any one type of sensor or sensed characteristic.

The sensors 50 are at spaced locations. In the example shown in FIG. 2, the sensors 50 are arranged in an array. It is to be appreciated that the invention is neither limited to the shown specific array nor any other particular pattern or arrangement of the sensors 50.

In sensing weight force applied at the plurality of sensors 50, an indication of the location/position of the occupant on the vehicle seat 38 is provided. As such, the plurality of sensors 50 provides for the sensing of the position and weight of the occupant 34. For the purpose of illustration only and not for the purpose of limiting the present invention, in the example shown, the sensors 50 are designated as position/weight (P/W) sensors.

To further explain the concept of sensing occupant location, consider an example where a number of the sensors 50 that are located near the front of the vehicle seat 36 sense a downward force somewhat greater than the downward force sensed by other of the sensors 50 located elsewhere throughout the seat. This distribution of sensed weight force may be regarded as an indication that the occupant 34 is sitting toward the front of the vehicle seat 36. As such, the occupant 34 may be positioned close to the instrument panel 22 and the air bag 18. Accordingly, upon the detection of a deployment crash event, it may be desirable to adjust inflation of the air bag 18. For example, it may be desirable to deploy only at a reduced inflation pressure or to completely suppress deploying the air bag 18.

Each of the sensors 50 has a drive circuit (not shown) associated with it. Such drive circuits are generally known in the art and are not, therefore, discussed in detail herein. Each drive circuit outputs an electrical signal indicative of the output of the respective one of the sensors 50. Because each drive circuit outputs an electrical signal indicative of the output of each respective one of the sensors 50, the output of each drive circuit is hereinafter synonymously referred to as the output of each sensor. The output of each drive circuit is operatively connected to the controller 16 (FIG. 1). The controller 16 is programmed to sample or read the output from the drive circuits to determine the position/weight of the occupant 34.

Because some crash events occur very rapidly, the position of the occupant 34 on the vehicle seat 36 may change quickly during a crash event. For instance, assume, for the purpose of illustration only and not for the purpose of limiting the present invention, that the array of sensors 50 (FIG. 2) located within the vehicle seat 36 comprises ninety separate sensors.

To sample the output of all ninety sensors 50, it may take the controller 16 a period of time that is lengthy relative to the duration of a crash event and/or a pre-crash braking situation. For instance, if it takes the controller 16 five hundred milliseconds to sample the output of all ninety sensors 50 and a crash event occurs in a matter of seconds, the sample time may be too lengthy to permit the controller 16 to timely update the position of the occupant during the crash event and/or pre-crash braking situation.

In accordance with the present invention, the output of the sensors 50 are rapidly sampled in a fashion such that that the controller 16 can quickly track and update the position of the occupant 34 as the position of the occupant changes during the crash event and/or pre-crash braking situation.

Figure 2:
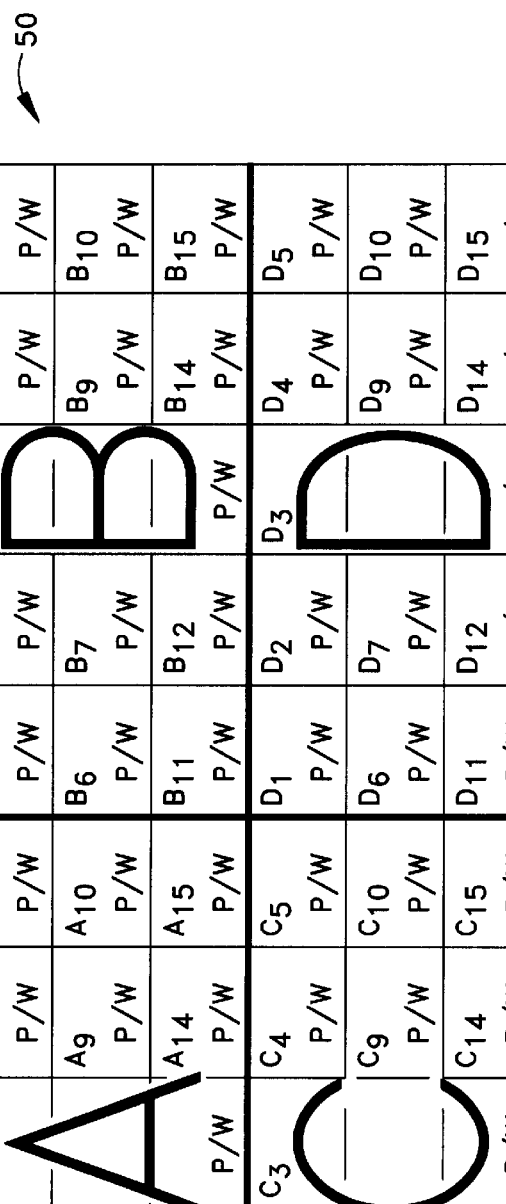
FIG. 2 is a top plan view of an array of occupant position/weight sensors that are incorporated into a vehicle seat bottom and utilized in accordance with the present invention.

For instance, assume that the array of ninety sensors in the example illustrated in FIG. 2 are arranged in nine rows and ten columns where the rows extend across the seat and the columns extend from the front of the seat to the rear of the seat. The controller 16 first groups the plurality of sensors 50 into sensor sets. The controller 16 then samples the output of at least one of the sensors 50 in at least one of the sets. By sampling only some, rather than sampling all, of the sensors, the controller ascertains an indication of the occupant's position on the vehicle seat 36 in a period of time that is much shorter than if the controller 16 sampled the output of all ninety sensors within the vehicle seat 36. Such sampling may be predicated on the fact that the sensors within a single group generally perceive similar weight forces.

Once the controller 16 ascertains a quick indication of the occupant's position from the first sampling, the controller then samples the output of another sensor in at least one of the sensor sets. The controller 16 can sample the output of most any of the sensors 50 during this subsequent sampling. However, the controller 16 does not sample the output of those sensors 50 that were sampled in the previous sampling. In this fashion the controller 16 quickly ascertains another indication of the occupant's position. Because all of the sensors 50 are located at slightly different locations throughout the vehicle seat 36, with these two samplings, the controller 16 can ascertain whether or not the occupant has moved during the crash event and/or pre-crash braking situation as well as the direction of movement. The controller 16 can continue to sample the sensors 50 until a desired number of sensors, including all ninety, have been sampled. The controller 16 may be programmed to continually repeat the entire process.

By way of a more detailed example and for the purposes of illustration only and not for the purposes of limiting the present invent-on, with respect to the array of ninety sensors 50 illustrated in FIG. 2, the controller 16 may first group the array of ninety sensors into six sensor sets, namely A, B, C, D, E and F. In the example shown, an equal number of sensors, namely fifteen, are grouped within each of the sensor sets. However, it is to be appreciated that any number of sensors may be grouped into any number of sensor sets with each sensor set containing any number of sensors. There is no need for the sensor sets to have any particular number of sensors N, nor a need for the number of sensors in a set to equal the number of sensors in another set.

The controller 16 may first sample the output of sensor A1. This sensor is located at the front leftmost portion of the vehicle seat 36. The controller 16 may then sample the output of any other sensors 50 within the vehicle seat 36 to quickly ascertain the position of the occupant 34. For instance, the controller 16 may then sample the output of sensors B1, C1, D1, E1 and F1. The controller 16 can then quickly ascertain the location of the occupant 34 from the sampled output of each of these six sensors. For instance, if the output of sensor A1 and the output of sensor B1 is greater than the output of sensors C1, D1, E1 and F1, the controller 16 may regard this as an indication that the occupant 34 is sitting toward the front of the vehicle seat 36 and the deployment of the air bag 18 can be controlled accordingly.

In the foregoing example, because the outputs of only six of the ninety sensors 50 are sampled, an indication of the position of the occupant 34 is ascertained in one fifteenth the amount of time it would take to determine the position of the occupant if the output of all ninety sensors were sampled. The sampled output of sensors A1, B1, C1, D1, E1 and F1 is said to define a subset of the output of all the sensors 50. Because this subset is used to ascertain the position of the occupant 34 on the vehicle seat 36 at the time of the first sampling, this subset can be thought of as a subset of the occupant's position. More particularly, this subset can be thought of as a subset of the occupant's position over time, such as during the crash event and/or pre-crash braking situation.

It is to be appreciated that the output of any number of sensors 50 from any of the sensor sets may be sampled to define the first subset. For instance, instead of sampling the output of one sensor in each of the sensor sets, the controller 16 can sample the output from two sensors in each of the sensor sets to define the first subset. This, however, would likely take twice as long as sampling the output of only one sensor in each of the sensor sets. Alternatively, the output of one sensor in less than all of-the sensor sets may be sampled to define the first subset. For instance, the output of one sensor in sensor sets A, B, E and F may be sampled to define the first set. This would likely take less time than sampling the output of one sensor in each of the six sensor sets. It is to be appreciated that the output of any number of sensors from any of the sensor sets may be sampled to define the first subset.

The sensors whose outputs are sampled to define the first subset are designated as the $N^{th}$ sensors of their respective sensor sets. For instance, where the output of sensors A1, B1, C1, D1, E1 and F1 are sampled to define the first subset, sensor A1 is designated as the $N^{th}$ sensor of sensor set A, sensor B1 is designated as the $N^{th}$ sensor of sensor set B. sensor C1 is designated as the $N^{th}$ sensor of sensor set C, sensor D1 is designated as the $N^{th}$ sensor of sensor set D, sensor E1 is designated as the $N^{th}$ sensor of sensor set E, sensor F1 is designated as the $N^{th}$ sensor of sensor set F.

Once the first subset is defined and the position of the occupant 34 is thereby ascertained, the controller 16 begins a second sampling of the output of the sensors to define a second subset and thereby ascertain the position of the occupant 34 at a subsequent point in time. As mentioned above, the output from most any of the sensors may be sampled to define the second subset. However, the sensors that were sampled to define the first subset are not sampled to define the second subset. For instance, where sensors A1, B1, C1, D1, E1 and F1 were sampled to define the first subset, these six sensors are not again sampled to define the second subset. This permits better resolution of the occupant's position and direction of movement from the differently located sensors 50 within the vehicle seat 36.

Again, depending upon the number of sensors whose output is sampled, the second subset is defined in a period of time that is shorter than the amount of time it would take to sample the output of all ninety sensors. For instance, as with defining the first subset, if the output of six sensors, such as sensors A15, B15, C15, D15, E15 and F15 are sampled to define the second subset, this takes one fifteenth the amount of time it would take to sample the output of all ninety sensors.

The sensors 50 whose outputs are sampled to define the second subset are designated as the $N^{th+1}$ sensors of their respective sensor sets. For instance, where the output of sensors A15, B15, C15, D15, E15 and F15 are sampled to define the second subset, sensor A15 is known as the $N^{th+1}$ sensor of sensor set A, sensor B15 is known as the $N^{th+1}$ sensor of sensor set B, sensor C15 is known as the $N^{th+1}$ sensor of sensor set C, sensor D15 is known as the $N^{th+1}$ sensor of sensor set D, sensor E15 is known as the $N^{th+1}$ sensor of sensor set E, sensor F15 is known as the $N^{th+1}$ sensor of sensor set F. It is to be appreciated that the output from the $N^{th}$ sensors are sampled before the output of the $N^{th+1}$ sensors.

The controller 16 continues to sample the output of different sensors 50 in the vehicle seat 36 to define subsequent subsets. The controller 16 may be programmed to do this until the output from each of the sensors 50 in the array have been sampled. In so doing, the controller 16 continues to quickly obtain information regarding the position and movement of the occupant 34. The controller 16 can use this information to control the deployment of the air bag 18 with the squibs 30, 32 and/or the vent valves 38, 40.

Alternatively, the controller 16 may be programmed to make a deployment decision before the output of each and every one of the sensors is sampled. For instance, once a certain resolution of the occupant's position and direction of movement are ascertained, such as after a dozen subsets have been defined, the controller 16 may be programmed to make a deployment decision and control the deployment of the air bag 18 so that the air bag 18 may help protect the occupant 34 in a desired fashion.

Moreover, the protection system 12 that incorporates a plurality of sensors 50 in the vehicle seat 36 may limit the use of the present invention until a crash event and/or pre-crash braking situation is sensed. For instance, the controller 16 of such a protection system may sample the output of each and every sensor until a crash event is sensed. Once a crash event Is sensed, the controller 16 may then begin sampling the sensors 50 in accordance with the present invention. In so doing, the controller 16 will initially have a high resolution indication of the position of the occupant 34 based upon the output of all of the sensors 50. This would correspond to the position of the occupant 34 immediately before the crash event is sensed.

The controller 16 can use this pre-crash occupant position as a basis of comparison between the position of the occupant 34 immediately before the sensed crash event and immediately after the sensed crash event and/or pre-crash braking situation. Knowing the position of the instrument panel 22 and the initial position of the occupant 34 with respect to the instrument panel 22, the controller 16 may be programmed to calculate the rate and direction of occupant movement relative to the instrument panel 22. This information, coupled with the continually updated position of the occupant 34, can then be used to control the deployment of the air bag 18 so that the air bag may help protect the occupant 34 in a desired fashion.

Figure 3:
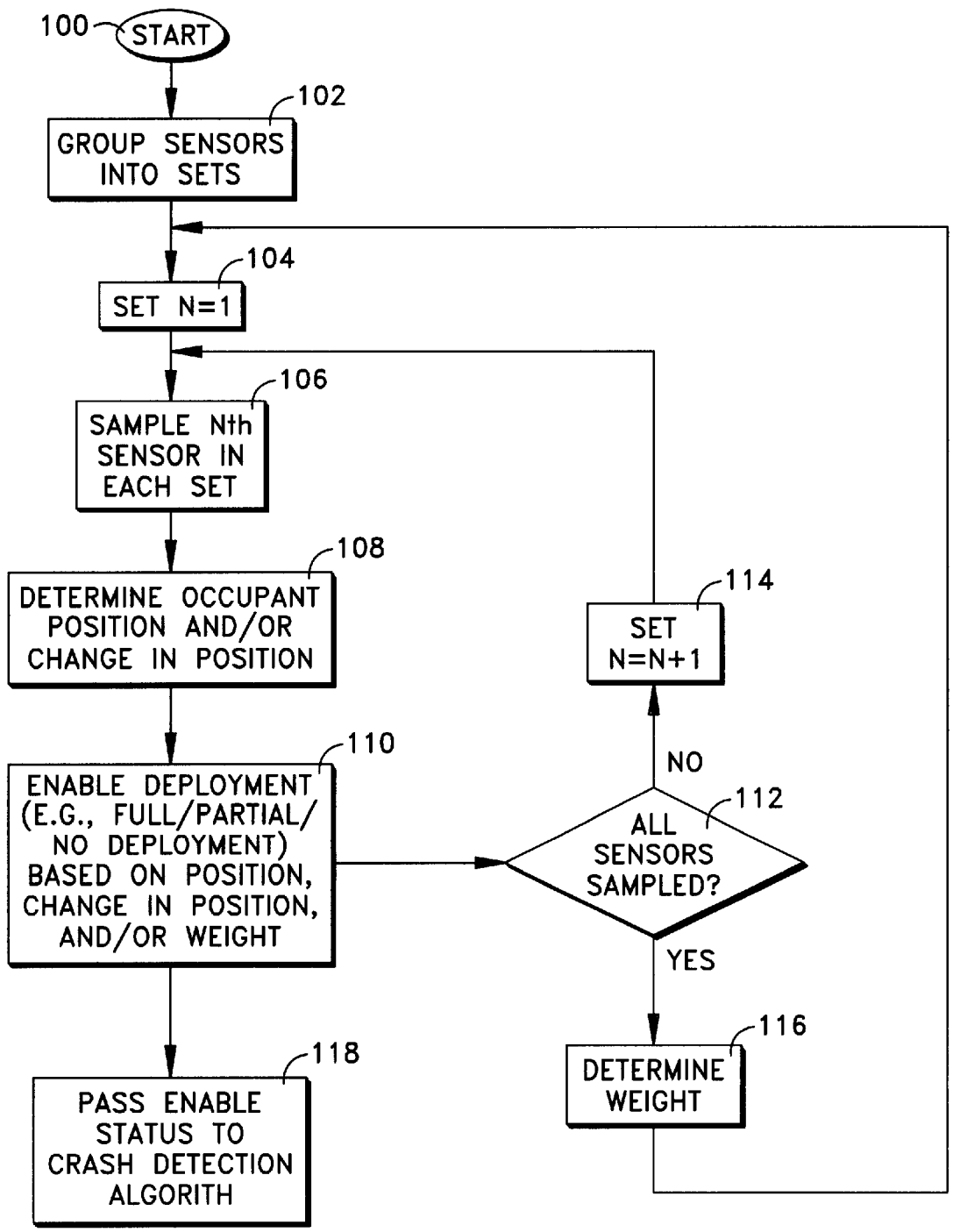
FIG. 3 is a flow chart of one example of a method in accordance with the present invention.

With respect to FIG. 3, a flow chart is illustrated for an example process in accordance with the present invention. The process starts at step 100 wherein memories are cleared, flags are set to their initial values, etc. At step 102 the controller 16 groups the sensors into sets. The process then proceeds to step 104 wherein the value of N is set to one.

At step 106 the $N^{th}$ sensor is sampled for each set. Base upon the current gathered sample values, a determination of the occupant position and/or a determination of a change in occupant position are made at step 108.

At step 110, enable deployment determinations are made based upon information that has been determined. Specifically, the deployment determinations may be based upon determined occupant position, determined change in occupant position, and/or determined weight. In the example, the deployment may be enabled to be a full or partial deployment, or the deployment may be suppressed.

The process loops from step 110 to step 112 where a determination is made whether all of the sensors in the array have been sampled. If the determination at step 112 is negative (i.e., all sensors not yet sampled), the process proceeds to step 114 wherein the value of N is incremented by one. After step 114, the process returns to step 106 to repeat sampling and determination steps 106–110.

If the determination in step 112 is affirmative (i.e., all sensors not yet sampled), the process proceeds to step 116. At step 116, occupant weight is determined. Upon completion of step 116, the process goes to step 104 where the value of N is again set to one. The sampling and determination steps 106–110 are again repeated. As a coordinate step 118 of the process looping to step 112 from step 110, the enable status is passed to the crash detection algorithm.

From the above description of the invention, those skilled in the art will perceive improvements, changes and modifications. Such improvements, changes and modifications are intended to be included within the scope of the appended claims.

Having described the invention, the following is claimed:

1. A system for determining a vehicle occupant characteristic, said system comprising:
    a plurality of sensors for sensing a parameter and outputting a parameter indicative signal, said sensors being arranged in a plurality of groups, with each sensor of a group sensing a similar parameter value; and
    determination means for utilizing only a portion of said sensors within each group to make a determination regarding the occupant characteristic.

2. A system as set forth in claim 1, wherein said sensors are weight sensors.

3. A system as set forth in claim 2, wherein the occupant characteristic is occupant position.

4. A system as set forth in claim 3, wherein said determination means includes means for determining change in occupant position.

5. A system as set forth in claim 1, wherein said sensors are located in a vehicle seat.

6. A system as set forth in claim 5, wherein said sensors are distributed across a portion of the vehicle seat, each group of sensors being located at a different area of the portion of the seat.

7. A system as set forth in claim 6, wherein said determination means includes means for using only one sensor from each group to make the determination regarding the occupant characteristic.

8. A system as set forth in claim 7, wherein said sensors are weight sensors, and the occupant characteristic is occupant position.

9. A system as set forth in claim 8, including means for sequentially utilizing different portions of the sensors within each group to make determinations regarding the occupant position.

10. A system as set forth in claim 8, wherein said means for sequentially utilizing includes means for utilizing one sensor within each group to each determination regarding occupant position.

11. A system as set forth in claim 1, wherein the determination regarding the occupant characteristic is utilized for control of an occupant protection device.

12. A system for determining a vehicle occupant weight-related characteristic, said system comprising:
    a plurality of weight sensors, each for sensing an applied force and for outputting a signal indicative of the sensed force, said plurality of sensors being located to sense applied force at a plurality of areas of a vehicle seat; and
    means for utilizing the force indicative signals from only a portion of said sensors to derive an indication of the occupant weight-related characteristic.

13. A system as set forth in claim 12, wherein the occupant weight-related characteristic is occupant position on the vehicle seat.

14. A system as set forth in claim 12, wherein said sensors are arranged in a plurality of groups, each group of sensors being located at a different portion of the vehicle seat, with all of the sensors within a group sensing a similar weight value, said portion of said sensors including at least one sensor from each group.

15. A system as set forth in claim 14, including means for sequentially utilizing different portions of the sensors to sequentially derive indications of the occupant weight-related characteristic.

16. A system as set forth in claim 12, wherein the indication of the occupant weight-related characteristic is utilized for control of an occupant protection device.

17. A method for determining a vehicle occupant characteristic, said method comprising:
    arranging a plurality of sensors that sense a parameter into a plurality of groups, with each sensor of a group sensing a similar parameter value and outputting a parameter indicative signal; and
    utilizing only a portion of the sensors within each group to make a determination regarding the occupant characteristic.

18. A system for determining an occupant weight-related characteristic, said system comprising:

a plurality of weight sensors located within a vehicle seat, each of said sensors sensing an applied force land outputting a signal indicative of the sensed force; and a controller that groups the plurality of sensors into a plurality of sensor sets;

wherein said controller samples the output of an $N^{th}$ sensor in at least one set prior to sampling the output of an $N^{th+1}$ sensor in another set.

19. A system for determining an occupant weight-related characteristic, said system comprising:

a plurality of weight sensors located within a vehicle seat, each of said sensors sensing an applied force and outputting a signal indicative of the sensed force; and a controller that groups the plurality of sensors into a plurality of sensor sets;

wherein said controller samples the output of an $N^{th}$ sensor in each set prior to sampling the output of an $N^{th+1}$ sensor in any one set.

20. A system as set forth in claim 19, wherein said controller groups an equal number of sensors into each of said plurality of sensor sets.

21. A system as set forth in claim 20, wherein the sampled outputs of the $N^{th}$ sensor define a subset indicative of the occupant characteristic.

22. A system as set forth in claim 20, wherein said controller samples the output of all of said sensors over a period of time thereby defining a plurality of subsets indicative of the occupant characteristic.

23. A system as set forth in claim 22, wherein said controller determines the occupant characteristic with one or more of said subsets.

24. A method for determining an occupant weight-related characteristic, said method comprising:

grouping a plurality of sensors located within a vehicle seat into a plurality of sensor sets, each of the sensors sensing an occupant characteristic and outputting a signal indicative of the sensed occupant characteristic; and, sampling the output of an $N^{th}$ sensor in each set prior to sampling the output of an $N^{th+1}$ sensor in another set.

25. A method as set forth in claim 24, wherein the sensed occupant characteristic is occupant position.

26. A method as set forth in claim 24, wherein an equal number of sensors are grouped into each sensor set.

27. A method as set forth in claim 24, wherein the sampled output of the $N^{th}$ sensor in each of the sets defines a subset of the sensed occupant characteristic.

28. A method as set forth in claim 27, wherein the sampled output of the $N^{th+1}$ sensor in each of the sets defines a second subset of the sensed occupant characteristic.

29. A method as set forth in claim 28, further comprising the step of:

defining a plurality of subsets over a period of time from the sampled output of one or more of the sensors in each of the sets.

30. A method as set forth in claim 29, further comprising the step of:

updating the sensed occupant characteristic with one or more of the subsets.

* * * * *